United States Patent
Savir et al.

(10) Patent No.: US 11,288,364 B1
(45) Date of Patent: Mar. 29, 2022

(54) DATA PROTECTION BASED ON CYBERSECURITY FEEDS

(71) Applicant: EMC IP Holding Company LLC, Hopkinton, MA (US)

(72) Inventors: Amihai Savir, Sansana (IL); Assaf Natanzon, Tel Aviv (IL); Avitan Gefen, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 295 days.

(21) Appl. No.: 16/394,221

(22) Filed: Apr. 25, 2019

(51) Int. Cl.
| | |
|---|---|
| *G06F 17/00* | (2019.01) |
| *G06F 21/55* | (2013.01) |
| *G06F 21/57* | (2013.01) |
| *G06F 11/14* | (2006.01) |
| *G06F 21/53* | (2013.01) |
| *G06F 40/216* | (2020.01) |

(52) U.S. Cl.
CPC ........ *G06F 21/554* (2013.01); *G06F 11/1461* (2013.01); *G06F 21/53* (2013.01); *G06F 21/552* (2013.01); *G06F 21/577* (2013.01); *G06F 40/216* (2020.01); *G06F 2201/86* (2013.01)

(58) Field of Classification Search
CPC .. G06F 21/554; G06F 40/216; G06F 11/1461; G06F 21/53; G06F 21/552; G06F 21/577; G06F 2201/86
See application file for complete search history.

(56) References Cited

U.S. PATENT DOCUMENTS

| | | | |
|---|---|---|---|
| 8,407,759 B1* | 3/2013 | Sotos | H04M 1/72412 |
| | | | 726/1 |
| 9,124,638 B1* | 9/2015 | Martini | H04L 63/1408 |
| 9,894,174 B2* | 2/2018 | Gandhi | G06F 16/958 |
| 10,503,610 B1* | 12/2019 | Shemer | G06F 11/1464 |
| 2017/0060897 A1* | 3/2017 | Madaan | G06F 21/6281 |
| 2018/0343277 A1* | 11/2018 | Drihem | H04L 63/1441 |
| 2019/0068627 A1* | 2/2019 | Thampy | H04L 63/1416 |
| 2019/0312910 A1* | 10/2019 | Convertino | G06F 16/24578 |
| 2020/0320215 A1* | 10/2020 | Bhosale | G06F 21/577 |

OTHER PUBLICATIONS

Thomas et al, "Improving Backup System Evaluation in Information Security Risk Assessments to Combat Ransomware" published Jan. 3, 2018, pp. 14-25. (Year: 2018).*

* cited by examiner

*Primary Examiner* — Baotran N To
(74) *Attorney, Agent, or Firm* — Dergosits & Noah LLP; Todd A. Noah

(57) ABSTRACT

Data protection based on cybersecurity feeds is described. A system receives cybersecurity feed content from a cybersecurity feed. If the cybersecurity feed content is relevant to data associated with an organization, the system evaluates a cybersecurity threat based on the cybersecurity feed content. The system selects at least one data protection policy, from multiple data protection policies, which corresponds to the evaluated cybersecurity threat. The system implements the selected at least one data protection policy.

20 Claims, 4 Drawing Sheets

DATA PROTECTION BASED ON CYBERSECURITY FEEDS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and then instructs the backup/restore application to execute a restore operation to restore a copy of the corresponding backup file(s) for that state to the data object.

DETAILED DESCRIPTION

Cybersecurity threats pose a significant challenge for data protection systems, such as a ransomware attack that encrypts data in a data protection system's primary storage system and backup storage system. Since the backup storage system is considered to be the storage system of last resort, protecting the data in the backup storage system is critical. Data protection systems' policies may base different protective actions on different cybersecurity threats. However, if a data protection system is not aware of a current cybersecurity threat, the data protection system's policy does not change to respond to the current cybersecurity threat.

Embodiments herein provide data protection based on cybersecurity feeds. A system receives cybersecurity feed content from a cybersecurity feed. If the cybersecurity feed content is relevant to data associated with an organization, the system evaluates a cybersecurity threat based on the cybersecurity feed content. The system selects at least one data protection policy, from multiple data protection policies, which corresponds to the evaluated cybersecurity threat. The system implements every selected data protection policy.

For example, a cybersecurity tool receives cybersecurity RSS feed content from DataProtect's cybersecurity RSS feed, extracts the fields that describe the Hydra malware from DataProtect's cybersecurity RSS feed content, and then uses an organizational representation to determine that the Hydra malware is relevant to an organization's data. The cybersecurity tool uses a ranking model to calculate a very high-ranking score of 9.0 because the relevant content describes the Hydra malware as a risk for system software that communicates with many applications that manage high-value user data. Therefore, the cybersecurity tool selects a policy that isolate a data protection storage system for very high risks, and then opens an air gap that isolates the data protection storage system because the very high-ranking score of 9.0 reflects the Hydra malware targeting system software that communicates with many applications that manage high-value user data. The cybersecurity tool used cybersecurity RSS feed content to became aware of a new cybersecurity threat, and changed the data protection policy to respond to the new cybersecurity threat to the organization's data.

Figure 1:
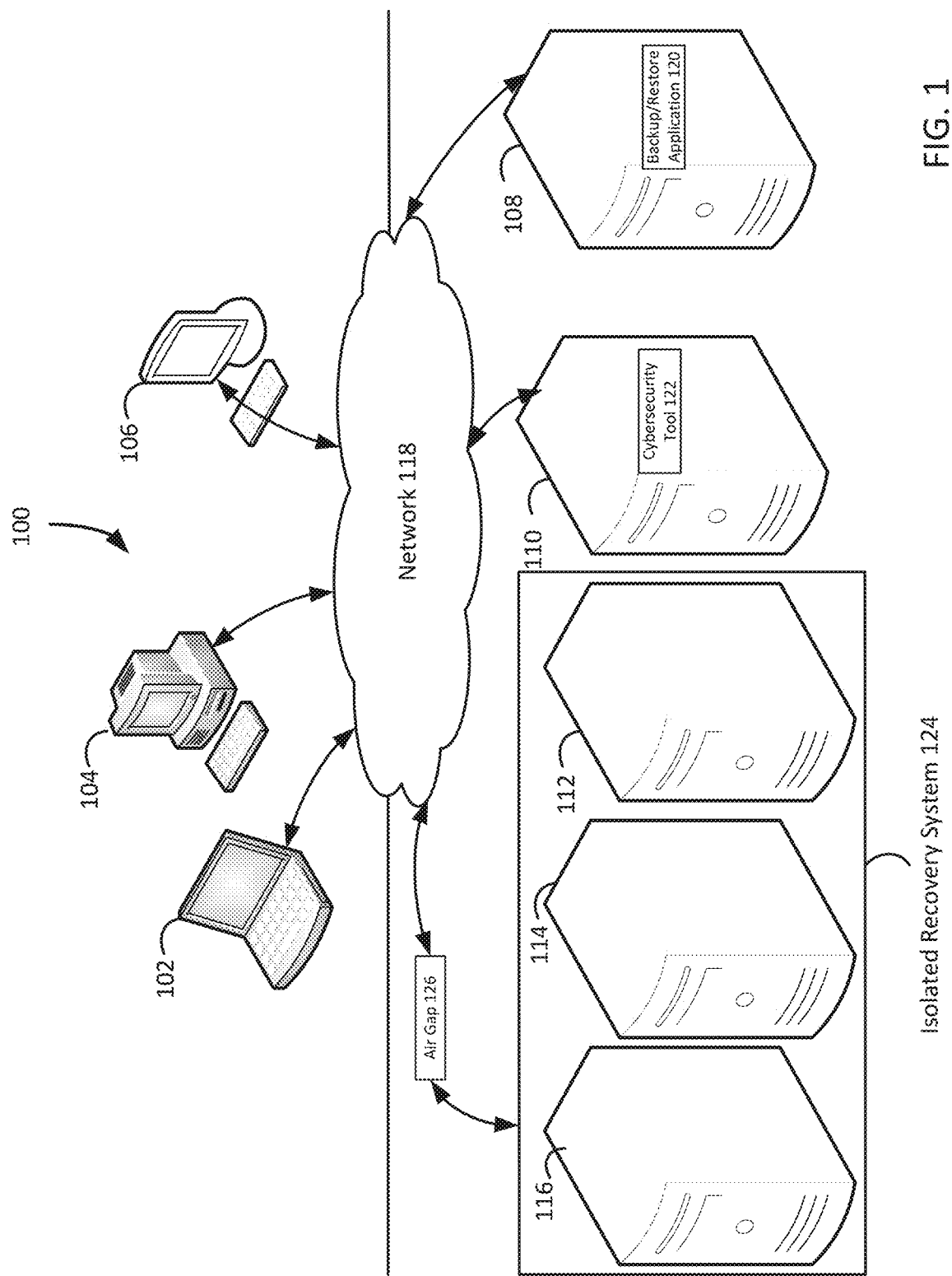
FIG. 1 illustrates a block diagram of an example system for data protection based on cybersecurity feeds, under an embodiment.

FIG. 1 illustrates a block diagram of a system that implements leveraging cybersecurity feeds to improve data protection, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a third server 112, a fourth server 114, and a fifth server 116 that may be provided by a hosting company. The clients 102-106 and the servers 108-116 communicate via a network 118. The first server 108 includes a backup/restore application 120, and the second server 110 includes a cybersecurity tool 122. In some embodiments, the cybersecurity tool 122 may be integrated in the backup/restore application 120.

In some embodiments, the third server 112 may be a management host 112, the fourth server 114 may be a validation host 114, and the fifth server 116 may be a recovery host 116 that are part of an isolated recovery system 124, which uses an air gap 126 when communicating with the clients 102-106 and the servers 108-110 via the network 118. The air gap 126 is a network security measure employed on one or more computers to ensure that a secure computer network is physically isolated from unsecured networks, such as the public Internet or an unsecured local area network. An "air-gapped" computer or network has no network interfaces, either wired or wireless, connected to outside networks. Dell/EMC provides the isolated recovery system 124 that protects data against cybersecurity threats by opening communication to the backup storage system when a short backup window begins, closing communications to the backup storage system when the short backup window ends, and keeping communications the backup storage system closed until the next short backup window begins. When the risk of a cybersecurity threat is high, it may be better not to open the air gap 126 to back up any data until the risk is reduced.

Although FIG. 1 depicts the first client 102 as a laptop computer 102, the second client 104 as a personal computer 104, and the third client 106 as an Apple® Macintosh computer 106, each of the clients 102-106 may be any type of computer, such as a server. Any combination of the servers 108-116 may be any combination of physical computers and virtual machines, or virtual servers. Although FIG. 1 depicts the system 100 with three clients 102-106, five servers 108-116, one network 118, one backup/restore application 120, one cybersecurity tool 122, one isolated recovery system 124, and one air gap 126, the system 100 may include any number of clients 102-106, any number of servers 108-116, any number of networks 118, any number of backup/restore applications 120, any number of cybersecurity tools 122, any number of isolated recovery systems 124, and any number of air gaps 126.

The clients 102-106 and the servers 108-116 may each be substantially similar to the system 400 depicted in FIG. 4 and described below in reference to FIG. 4. FIG. 1 depicts the backup/restore application 120 residing completely on the first server 108 and the cybersecurity tool 122 residing completely on the second server 110, but the backup/restore application 120 and/or the cybersecurity tool 122 may reside completely on any of the clients 102-106, completely on the first server 108, completely on the second server 110, or in any combination of partially on the clients 102-106, partially on the first server 108, and partially on the second server 110. The backup/restore application 120 and/or the cybersecurity tool 122 may provide a plug-in to any of the clients 102-106 and/or the servers 108-110 that enables any of the clients 102-106 and/or the servers 108-110 to execute the backup/restore application 120 and/or the cybersecurity tool 122. Even though the following paragraphs describe EMC Corporation's Avamar® backup/restore application and EMC Corporation's NetWorker® backup/restore application as examples of the backup/restore application 120, the backup/restore application 120 may be any other backup/restore application which provides the backup/restore functionalities described in the Background section.

The backup/restore application 120 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems may be deployed in an integrated solution with EMC Corporation's Data Domain® systems for high-speed backup and recovery of specific data types.

The backup/restore application 120 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

Cybersecurity entities use cybersecurity feeds to provide timely and actionable information about current cybersecurity threats, vulnerabilities, and their solutions. A feed, which may be referred to as a web feed or a news feed, can be a data format used on the World Wide Web for providing users with frequently updated information. A cybersecurity feed can be a data format used on the World Wide Web for providing users with frequently updated information about the state of being protected against the unauthorized use of electronic data, the measures taken to achieve protection against the unauthorized use of electronic data. Cybersecurity feed content can be frequently updated information that is provided to users in a World Wide Web data format and that is about the state of being protected against the unauthorized use of electronic data, or the measures taken to achieve protection against the unauthorized use of electronic data.

A cybersecurity feed can be implemented as an RSS (Rich Site Summary or Really Simple Syndication) feed, which can be a type of web feed that provide users and applications with access to updates on online content in a standardized computer-readable format. An RSS feed can enable a user to keep track of many different websites in a single news aggregator. The news aggregator will automatically check the RSS feed sources for new content, and then enable any new content to be automatically passed from one website to another website or from a website to a user. This passing of content is referred to as web syndication. Websites typically use RSS feeds to publish frequently updated information, such as blog entries, news headlines, audio, video, and podcasts.

Some RSS feeds provide helpful information that cybersecurity professionals use to manage the balance between cybersecurity protection and system access. These cybersecurity RSS feeds offer breaking news and analysis on attacks, breaches, and vulnerabilities, as well as strategies for protecting an organization's data. Additionally, theses cybersecurity RSS feeds offer guidance on setting risk management and compliance policies. Leveraging such cybersecurity RSS feeds can enable the understanding of new cybersecurity attacks and understanding the risk to an organization's data. An organization can be a structured body of people with a particular purpose, especially a business, society, or association. Data can be information.

Cybersecurity feeds can include fields that describe a cybersecurity threat, such as fields for an alert, an overview, a detailed description, an impact, references, cybersecurity tips, affected systems, related software and versions, a publication date, a CVSS (Common Vulnerability Scoring system) score or any standard measurement of information technology vulnerability impacts, and corresponding strategies for protecting an organization's data. Since cybersecurity feeds from different cybersecurity entities can be composed differently, the content from different cybersecurity feeds can be related to the same subject, but this related content may arrive separately and during different time periods. Therefore, the cybersecurity tool 122 receives, aggregates, and analyzes the content from multiple cybersecurity feeds regardless of the content's source, the content's arrival time, and the content's structure.

Figure 2A:
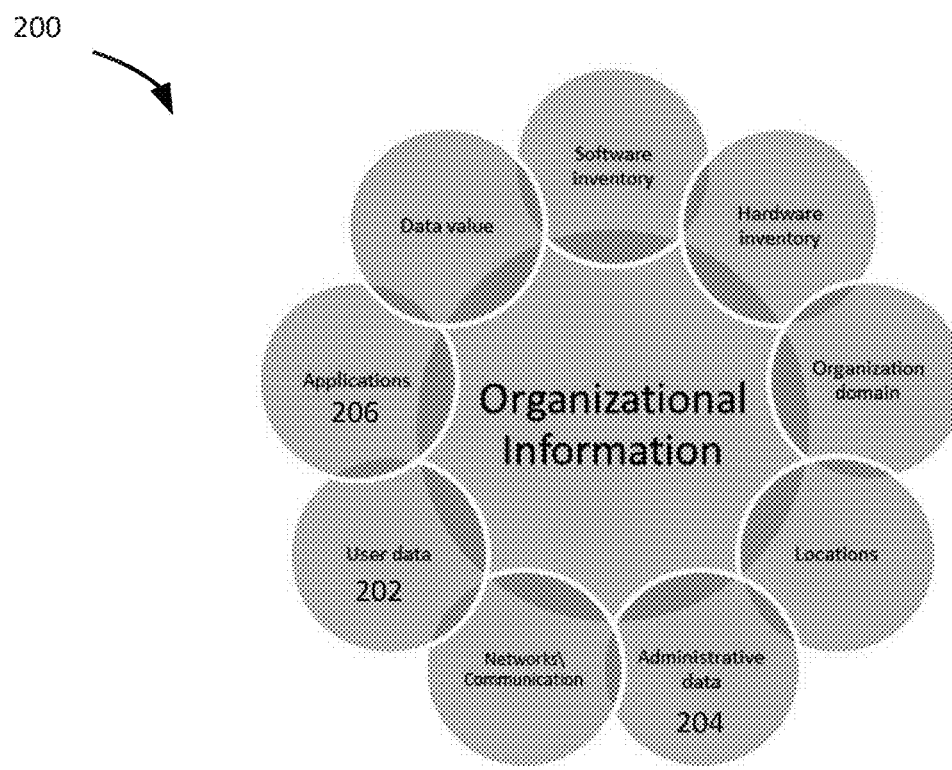
FIGS. 2A-B illustrate example representations of organizational information for data protection based on cybersecurity feeds, under an embodiment

When protecting an organization's data from cybersecurity threats, the cybersecurity tool 122 needs to evaluate only the cybersecurity feed content that is relevant to the organization. Therefore, the cybersecurity tool 122 uses an organizational representation to take a specific organization and its information into account when analyzing the organizational relevancy of the cybersecurity feed content. FIG. 2A depicts an example organizational representation 200 of the organizational information that the cybersecurity tool 122 takes into account to determine whether or not new cybersecurity feed content is relevant to a specific organization's data. The organizational representation 200 includes representations of user data 202 and administrative data 204, which would be directly relevant to a specific organization's data if targeted by a cybersecurity threat. The organizational representation 200 also includes a representation of applications 206, which would be indirectly relevant to a specific organization's data if targeted by a cybersecurity threat due to the impact by the applications 206 on the user data 202 and the administrative data 204. Relevant can be closely connected or appropriate to what is being done or considered.

Figure 2B:
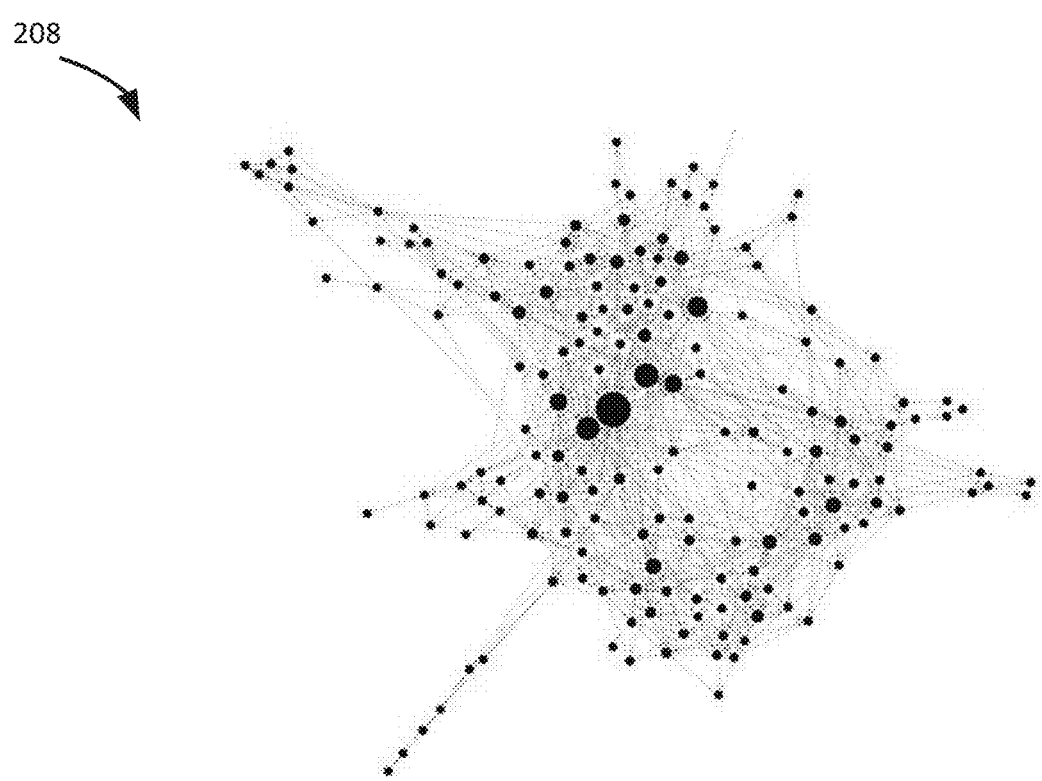

The cybersecurity tool 122 also takes the relationships between organizational assets into consideration when determining the relevance of cybersecurity feed content to organizational data. FIG. 2B depicts an example representation 208 of organizational assets and the connections between the organizational assets, in which each circle represents a specific organizational asset and the lines connecting the circles represent the data flow between the organizational assets. The sizes of the circles in the organizational representation 208 are proportional to the value of organization data stored on or processed by the organizational assets that the circles represent.

A classification model that uses historical cybersecurity feed content and the corresponding classifications can enable identification of which new cybersecurity feed content is relevant to a specific organization's data. The cybersecurity tool 122 receives cybersecurity feed content from cybersecurity feeds by pulling the cybersecurity feed content from multiple sources of cybersecurity feed content and merging the cybersecurity feed content. Then the cybersecurity tool 122 cleans and parses the merged content from the cybersecurity feed content by extracting appropriate fields from the merged cybersecurity feed content. Next, the cybersecurity tool 122 can use the classification model, historical cybersecurity feed content, and/or the organizational representations 202 and 208 to determine whether or not content from a cybersecurity feed is new content that is relevant to a specific organization's data.

For example, the cybersecurity tool 122 receives cybersecurity RSS feed content from DataProtect's cybersecurity RSS feed, extracts the fields that describe the Hydra malware from the received cybersecurity RSS feed content, and uses natural language processing and text analytics techniques to compare the description of the Hydra malware to historical cybersecurity feed content. The cybersecurity tool 122 may determine that the description of the Hydra malware is not new content because this description is substantially identical to the description of the Hydra malware that was received previously from ProtectYourData's cybersecurity RSS feed. Alternatively, the cybersecurity tool 122 may determine that the description of the Hydra malware is new content because this description of the Hydra malware differs substantially from the description of the Hydra malware that was received previously from ProtectYourData's cybersecurity RSS feed. Natural language processing can be computer operations for understanding human communication. New content can be the latest subject matter. Historical cybersecurity feed content can be frequently updated information that was previously provided to users in a World Wide Web data format and that is about the state of being protected against the unauthorized use of electronic data, or the measures taken to achieve protection against the unauthorized use of electronic data.

If the currently received cybersecurity feed content is new content, then the cybersecurity tool 122 can use the organizational representations 200 and 208, and the classification model to determine whether or not the current cybersecurity feed content is relevant to a specific organization's data. The cybersecurity tool 122 uses natural language processing and textual comparison to identify the relevancy of the current cybersecurity feed content to the organizational assets represented by the organizational representations 200 and 208. If the cybersecurity tool 122 determines that the current cybersecurity feed content is relevant to at least one organizational asset, then the current cybersecurity feed content is considered to be relevant to the organization. As an alternative to the binary classifications of relevant/not relevant, the cybersecurity tool 122 can use probabilities that estimate the relevance of the current cybersecurity feed content to a specific organization's data to calculate a relevance score, and then compare the relevance score to a relevance threshold to determine whether or not the current cybersecurity feed content is relevant to the organization's data.

After the determination of the current cybersecurity feed content's relevance, the cybersecurity tool 122 can use feedback from a cybersecurity analyst to confirm the relevance classification and improve the classification model. The repository of classified cybersecurity feed content can be saved for reuse—for classification and enrichment of new cybersecurity feed content, and for training and improving the classification model.

If the new content from the cybersecurity feeds is relevant to a specific organization, the cybersecurity tool 122 can use a ranking model to evaluate a cybersecurity threat based on the relevant new content by determining a ranking score for the relevant new content from a cybersecurity feed. The ranking model can base the ranking score on the sensitivity or importance of any organizational assets referenced by the relevant new content, any available CVSS score or standard measurement of information technology vulnerability impacts, and/or the historical ranking scores for historical cybersecurity feed content. The sensitivity or importance of an organizational asset can be determined based on the communication between organizational assets that are connected to an organizational asset that is referenced by relevant new content, the amount of data flow through the organizational asset that is referenced by relevant new content, and the value of data stored on the organizational asset that is referenced by relevant new content. A ranking score can be a position in a scale of status, and/or a classification.

When a cybersecurity event occurs on an organizational asset that communicates with numerous other organizational assets, the cybersecurity event can adversely affect the other organizational assets. Therefore, the ranking model calculates a higher-ranking score for an organizational asset that communicates with numerous other organizational assets to avoid a situation in which a large part of an organization is paralyzed when a security event occurs on such a connected organizational asset. Consequently, when a security event occurs on such an organizational asset, the connected organizational assets will also be examined to ensure that they are not adversely affected by the security event.

Research into the economic value or business priority of data has resulted in different approaches for measuring and storing specific numeric metadata (such as currency amounts of relative rankings) in a valuation ecosystem. Any type of valuation may be assigned to a data set, such as an economic cost (a dollar or euro amount), the intrinsic value, or the business value. If the valuation of data is unknown or uninitialized, a number of different approaches can be used, such as default values or estimations based on historical cybersecurity feed content. The ranking model can use such a value of data to calculate a ranking score for an organizational asset referenced by relevant new content.

For example, the cybersecurity tool 122 uses the ranking model to calculate a medium-ranking score of 7.0 because the relevant new content describes the Hydra malware as a risk for a database application that manages some user data that is medium-value data according to a valuation table. In another example, the cybersecurity tool 122 uses the ranking model to calculate a high-ranking score of 8.0 because the relevant new content describes the Hydra malware as a risk for user data that is high-value data according to a valuation table. In yet another example, the cybersecurity tool 122 uses the ranking model to calculate a very high-ranking score of 9.0 because the relevant new content describes the Hydra malware as a risk for system software that communicates with many applications that manage user data that is high-value data according to a valuation table. In a further example, the cybersecurity tool 122 uses the ranking model to calculate the highest-ranking score of 10.0 because the relevant new content describes the Hydra malware as a risk for the backup/restore application 120 that backs up user data that includes the highest-value data according to a valuation table.

After the calculation of the ranking score, feedback from a security analyst may be used to confirm the ranking score and improve the ranking model. The repository of ranked scores may be saved for reuse—for training and improvement of the ranking model.

The process of evaluating a cybersecurity threat based on the cybersecurity feed content may include the cybersecurity tool 122 identifying at least one data protection policy, from multiple data protection policies, which corresponds to the evaluated cybersecurity threat. For example, since the relevant new content describes the Hydra malware as a risk for the backup/restore application 120 that backs up user data that includes the highest-value data to a data protection storage system, the cybersecurity tool 122 identifies a policy that isolates the data protection storage system accessed by the backup/restore application 120.

Following the evaluation of the relevant new content, the cybersecurity tool 122 selects at least one data protection policy, from multiple data protection policies, which corresponds to the evaluated cybersecurity threat. The at least one data protection policy which corresponds to the identified cybersecurity threat can be a policy to complete backup of critical data and stop backup of non-critical data, a policy to lock data in retention mode, and/or a policy to isolate a data protection storage system. A policy can be a course of action adopted or proposed by an organization. A data protection policy can be a course of action adopted or proposed by an organization to keep information safe from harm. A backup can be the procedure for making extra copies of information in case the original copy of information is lost or damaged. Critical data can be information that has a decisive or crucial importance in the success, failure, or existence of something. Non-critical data can be information that lacks a decisive or crucial importance in the success, failure, or existence of something. Retention mode can be the state of keeping something unchanged. Isolate can be to be alone or apart from others.

For example, the cybersecurity tool 122 selects a policy for medium risks that completes backup of critical data and stops backup of non-critical data because the cybersecurity tool 122 calculated a medium-ranking score of 7.0 to reflect the Hydra malware targeting a database application that manages some user data that is medium-value data. In another example, the cybersecurity tool 122 selects a policy for high-risks that locks data in retention mode because the cybersecurity tool 122 calculated a high-ranking score of 8.0 that reflects the Hydra malware targeting user data that is high-value data. In yet another example, the cybersecurity tool 122 selects a policy for very-high risks that isolates a data protection storage system because the cybersecurity tool 122 calculated a very high-ranking score of 9.0 that reflects the Hydra malware targeting system software that communicates with many applications that manage user data that is high-value data. In a further example, the cybersecurity tool 122 selects a policy for the highest-risks that locks data in retention mode and also isolates a data protection storage system because the cybersecurity tool 122 calculated a highest-ranking score of 10.0 that reflects the Hydra malware targeting the backup/restore application 120 that backs up user data that includes the highest-value data.

Having selected at least one data protection policy, the cybersecurity tool 122 implements every selected data protection policy. For example, the cybersecurity tool 122 completes backup of critical data and stops backup of non-critical data because the medium-ranking score of 7.0 reflects the Hydra malware targeting a database application that manages some medium-value user data. In another example, the cybersecurity tool 122 locks data in retention mode because the high-ranking score of 8.0 reflects the Hydra malware targeting user data that is high-value user data. In yet another example, the cybersecurity tool 122 opens the air gap 126 to isolate a data protection storage system because the very high-ranking score of 9.0 reflects the Hydra malware targeting system software that communicates with many applications that manage high-value user data. The cybersecurity tool 122 can automatically stop all current backups and close the networking to the isolated recovery system 118 during the backup window if there is currently a very high security risk. In a further example, the cybersecurity tool 122 locks data in retention mode and isolates a data protection storage system because the highest-ranking score of 10.0 reflects the Hydra malware targeting the backup/restore application 120 that backs up the highest-value user data. In each of these examples, the cybersecurity tool 122 used cybersecurity RSS feed content to became aware of a new cybersecurity threat, and then changed the data protection policy to respond to the new cybersecurity threat to the organization's data.

Figure 3:
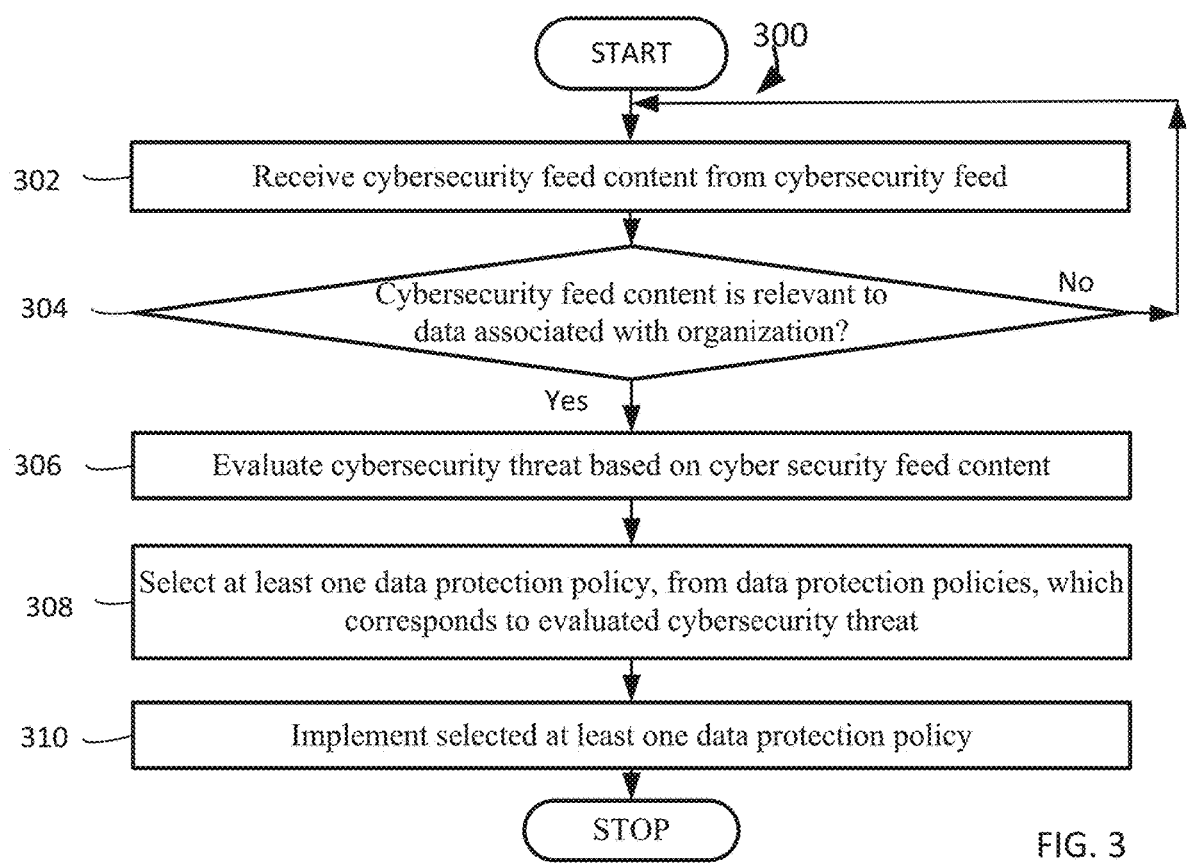
FIG. 3 is a flowchart that illustrates a method for data protection based on cybersecurity feeds, under an embodiment.

FIG. 3 is a flowchart that illustrates a method for data protection based on cybersecurity feeds, under an embodiment. Flowchart 300 illustrates method acts illustrated as flowchart blocks for certain steps involved in and/or between the clients 102-106 and/or the servers 108-116 of FIG. 1.

Cybersecurity feed content is received from a cybersecurity feed, block 302. The system receives information about an organization's potential cybersecurity threats. For example, and without limitation, this can include the cybersecurity tool 122 receiving cybersecurity RSS feed content from DataProtect's cybersecurity RSS feed.

After receiving cybersecurity feed content, a determination is made whether the cybersecurity feed content is relevant to data associated with an organization. block 304. The system determines whether currently received cybersecurity information is relevant to a specific organization's data. By way of example and without limitation, this can include the cybersecurity tool 122 extracting the fields that describe the Hydra malware from DataProtect's cybersecurity RSS feed content, and then using natural language processing and text analytics techniques to compare the description of the Hydra malware to historical cybersecurity RSS feed content. Continuing the example, the cybersecurity tool 122 determines that this description of the Hydra malware is new content because this description differs substantially from the description of the Hydra malware that was received previously from ProtectYourData's cybersecurity RSS feed. Then the cybersecurity tool 122 uses natural language processing and textual comparison to identify the relevancy of the current cybersecurity RSS feed content to the organizational assets represented by the organizational representations 200 and 208. If the currently received cybersecurity feed content is relevant to a specific organization's data, the method 300 continues to block 306 to evaluate the cybersecurity threat. If the currently received cybersecurity feed content is not relevant to a specific organization's data, the method 300 returns to block 302 to receive more cybersecurity feed content.

If the currently received cybersecurity feed content is relevant to a specific organization's data, a cybersecurity threat is evaluated based on the cybersecurity feed content, block 306. The system evaluates a relevant cybersecurity threat. In embodiments, this can include the cybersecurity tool 122 using the ranking model to calculate a very high-ranking score of 9.0 because the relevant new content describes the Hydra malware as a risk for system software that communicates with many applications that manage user data that is high-value data.

Following the evaluation of a cybersecurity threat, at least one data protection policy is selected, from multiple data protection policies, which corresponds to the evaluated cybersecurity threat, block 308. The system selects a policy to protect an organization's data against a relevant cybersecurity threat. For example, and without limitation, this can include the cybersecurity tool 122 selecting a policy for very-high risks that isolates a data protection storage system because the cybersecurity tool 122 calculated a very high-ranking score of 9.0 that reflects the Hydra malware targeting system software that communicates with many applications that manage high-value user data.

Having selected at least one data protection policy, the at least one data protection policy is implemented, block 310. The system protects an organization's data against a relevant cybersecurity threat. By way of example and without limitation, this can include the cybersecurity tool 122 opening the air gap 126 to isolate a data protection storage system because the very high-ranking score of 9.0 reflects the Hydra malware targeting system software that communicates with many applications that manage high-value user data.

Although FIG. 3 depicts the blocks 302-310 occurring in a specific order, the blocks 302-310 may occur in another order. In other implementations, each of the blocks 302-310 may also be executed in combination with other blocks and/or some blocks may be divided into a different set of blocks.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, data entry module 408, display adapter 410, communication interface 412, and a bus 414 that couples elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in memory 404 and/or storage 406 and/or received via data entry module 408.

The memory 404 may include read only memory (ROM) 416 and random access memory (RAM) 418. Memory 404 may be configured to store program instructions and data during operation of device 400. In various embodiments, memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 404 may also include nonvolatile memory technologies such as nonvolatile flash RAM (NVRAM) or ROM. In some embodiments, it is contemplated that memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, ROM 416 or RAM 418, including an operating system 422, one or more applications programs 424, program data 426, and other program modules 428. A user may enter commands and information into the hardware device 400 through data entry module 408. Data entry module 408 may include mechanisms such as a keyboard, a touch screen, a pointing device, etc. Other external input devices (not shown) are connected to the hardware device 400 via external data entry interface 430. By way of example and not limitation, external input devices may include a microphone, joystick, game pad, satellite dish, scanner, or the like. In some embodiments, external input devices may include video or audio input devices such as a video camera, a still camera, etc. Data entry module 408 may be configured to receive input from one or more users of device 400 and to deliver such input to processing unit 402 and/or memory 404 via bus 414.

A display 432 is also connected to the bus 414 via display adapter 410. Display 432 may be configured to display output of device 400 to one or more users. In some embodiments, a given device such as a touch screen, for example, may function as both data entry module 408 and display 432. External display devices may also be connected to the bus 414 via external display interface 434. Other peripheral output devices, not shown, such as speakers and printers, may be connected to the hardware device 400.

The hardware device 400 may operate in a networked environment using logical connections to one or more remote nodes (not shown) via communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 412 may include logic configured to support direct memory access (DMA) transfers between memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

Figure 4:
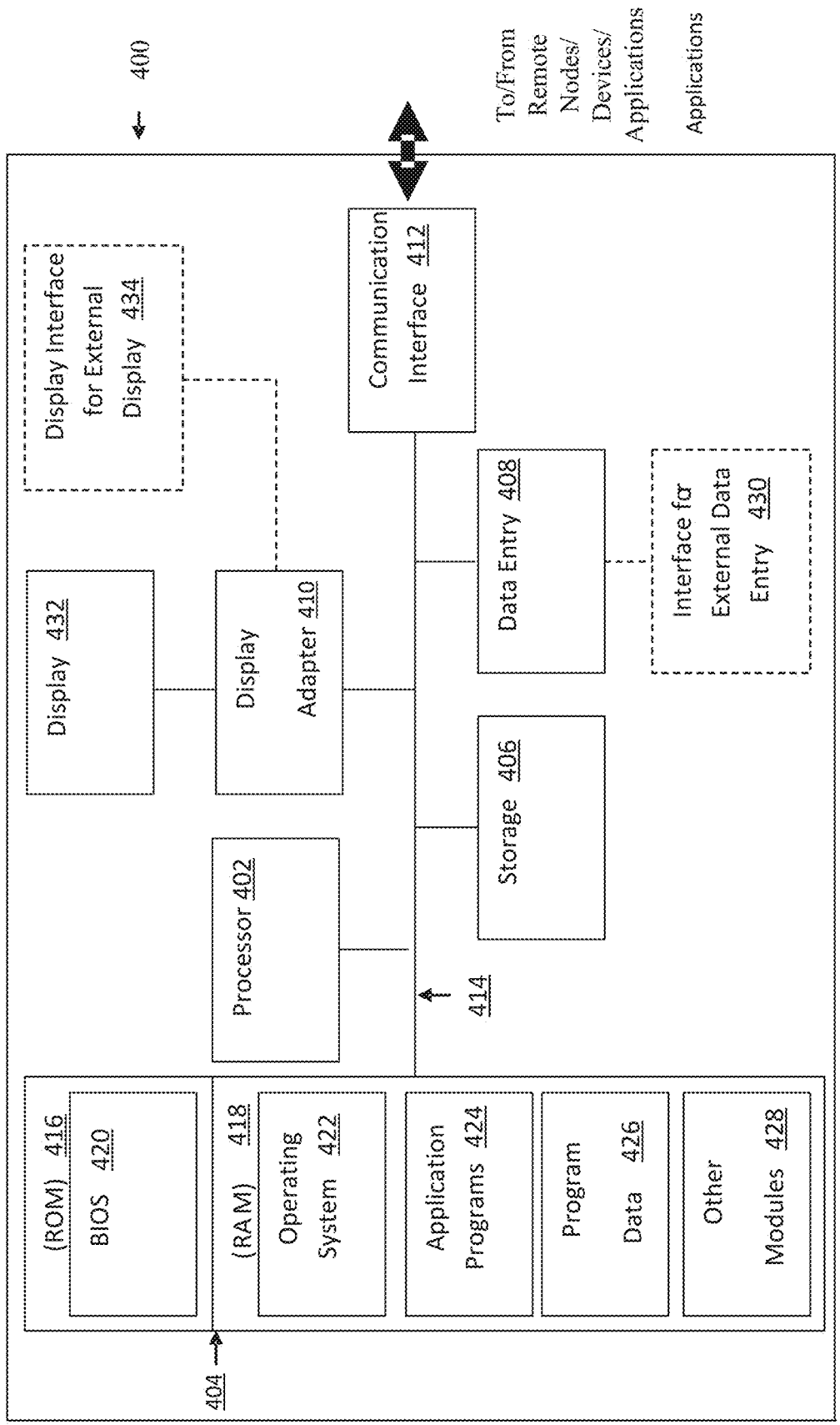
FIG. 4 is a block diagram illustrating an example hardware device in which the subject matter may be implemented.

It should be understood that the arrangement of hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   one or more processors; and
   a non-transitory computer readable medium storing a plurality of instructions, which when executed, cause the one or more processors to:
   determine, in response to receiving cybersecurity feed content from a cybersecurity feed, whether the cybersecurity feed content is relevant to data associated with an organization;
   evaluate, in response to a determination that the cybersecurity feed content is relevant to the data associated with the organization, a cybersecurity threat based on the cybersecurity feed content, by determining a ranking score for the cybersecurity feed content, the ranking score representing a risk of the cybersecurity threat on the data associated with the organization;
   select at least one data protection policy, from a plurality of data protection policies, which corresponds to the evaluated cybersecurity threat based on the ranking score for the cybersecurity feed content; and
   implement the selected at least one data protection policy.

2. The system of claim 1, wherein the cybersecurity feed comprises a Real Simple Syndication (RSS) feed.

3. The system of claim 1, wherein determining whether the cybersecurity feed content is relevant to the data associated with the organization comprises using natural language processing to analyze the cybersecurity feed content, and determining whether the cybersecurity feed content comprises new content relative to historical cybersecurity feed content.

4. The system of claim 1, wherein evaluating the cybersecurity threat based on the cybersecurity feed content comprises using natural language processing to analyze the cybersecurity feed content, and identifying a corresponding data protection policy.

5. The system of claim 1, wherein the at least one data protection policy which corresponds to the identified cybersecurity threat comprises a policy to complete backup of critical data and stop backup of non-critical data.

6. The system of claim 1, wherein the at least one data protection policy which corresponds to the identified cybersecurity threat comprises a policy to lock data in retention mode.

7. The system of claim 1, wherein the at least one data protection policy which corresponds to the identified cybersecurity threat comprises a policy to isolate a data protection storage system.

8. A method comprising:
   determine, in response to receiving cybersecurity feed content from a cybersecurity feed, whether the cybersecurity feed content is relevant to data associated with an organization;
   evaluate, in response to a determination that the cybersecurity feed content is relevant to the data associated with the organization, a cybersecurity threat based on the cybersecurity feed content, by determining a ranking score for the cybersecurity feed content, the ranking score representing a risk of the cybersecurity threat on the data associated with the organization;
   select at least one data protection policy, from a plurality of data protection policies, which corresponds to the evaluated cybersecurity threat based on the ranking score for the cybersecurity feed content; and
   implement the selected at least one data protection policy.

9. The method of claim 8, wherein the cybersecurity feed comprises a Real Simple Syndication (RSS) feed.

10. The method of claim 8, wherein determining whether the cybersecurity feed content is relevant to the data associated with the organization comprises using natural language processing to analyze the cybersecurity feed content, and determining whether the cybersecurity feed content comprises new content relative to historical cybersecurity feed content.

11. The method of claim 8, wherein evaluating the cybersecurity threat based on the cybersecurity feed content comprises using natural language processing to analyze the cybersecurity feed content, and identifying a corresponding data protection policy.

12. The method of claim 8, wherein the at least one data protection policy which corresponds to the identified cybersecurity threat comprises a policy to complete backup of critical data and stop backup of non-critical data.

13. The method of claim 8, wherein the at least one data protection policy which corresponds to the identified cybersecurity threat comprises a policy to lock data in retention mode.

14. The method of claim 8, wherein the at least one data protection policy which corresponds to the identified cybersecurity threat comprises a policy to isolate a data protection storage system.

15. A computer program product, comprising a non-transitory computer-readable medium having a computer-readable program code embodied therein to be executed by one or more processors, the program code including instructions to:
   determine, in response to receiving cybersecurity feed content from a cybersecurity feed, whether the cybersecurity feed content is relevant to data associated with an organization;
   evaluate, in response to a determination that the cybersecurity feed content is relevant to the data associated with the organization, a cybersecurity threat based on the cybersecurity feed content, by determining a ranking score for the cybersecurity feed content, the ranking score representing a risk of the cybersecurity threat on the data associated with the organization;
   select at least one data protection policy, from a plurality of data protection policies, which corresponds to the evaluated cybersecurity threat based on the ranking score for the cybersecurity feed content; and
   implement the selected at least one data protection policy.

16. The computer program product of claim 15, wherein the cybersecurity feed comprises a Real Simple Syndication (RSS) feed.

17. The computer program product of claim 15, wherein determining whether the cybersecurity feed content is relevant to the data associated with the organization comprises using natural language processing to analyze the cybersecurity feed content, and determining whether the cybersecurity feed content comprises new content relative to historical cybersecurity feed content, and evaluating the cybersecurity threat based on the cybersecurity feed content comprises using natural language processing to analyze the cybersecurity feed content, and identifying a corresponding data protection policy.

18. The computer program product of claim 15, wherein the at least one data protection policy which corresponds to the identified cybersecurity threat comprises a policy to complete backup of critical data and stop backup of non-critical data.

19. The computer program product of claim 15, wherein the at least one data protection policy which corresponds to the identified cybersecurity threat comprises a policy to lock data in retention mode.

20. The computer program product of claim 15, wherein the at least one data protection policy which corresponds to the identified cybersecurity threat comprises a policy to isolate a data protection storage system.

\* \* \* \* \*